Nov. 13, 1923.
W. W. SIDES ET AL
HYDRAULIC CLUTCH
Filed April 26, 1919  2 Sheets-Sheet 1
1,474,007
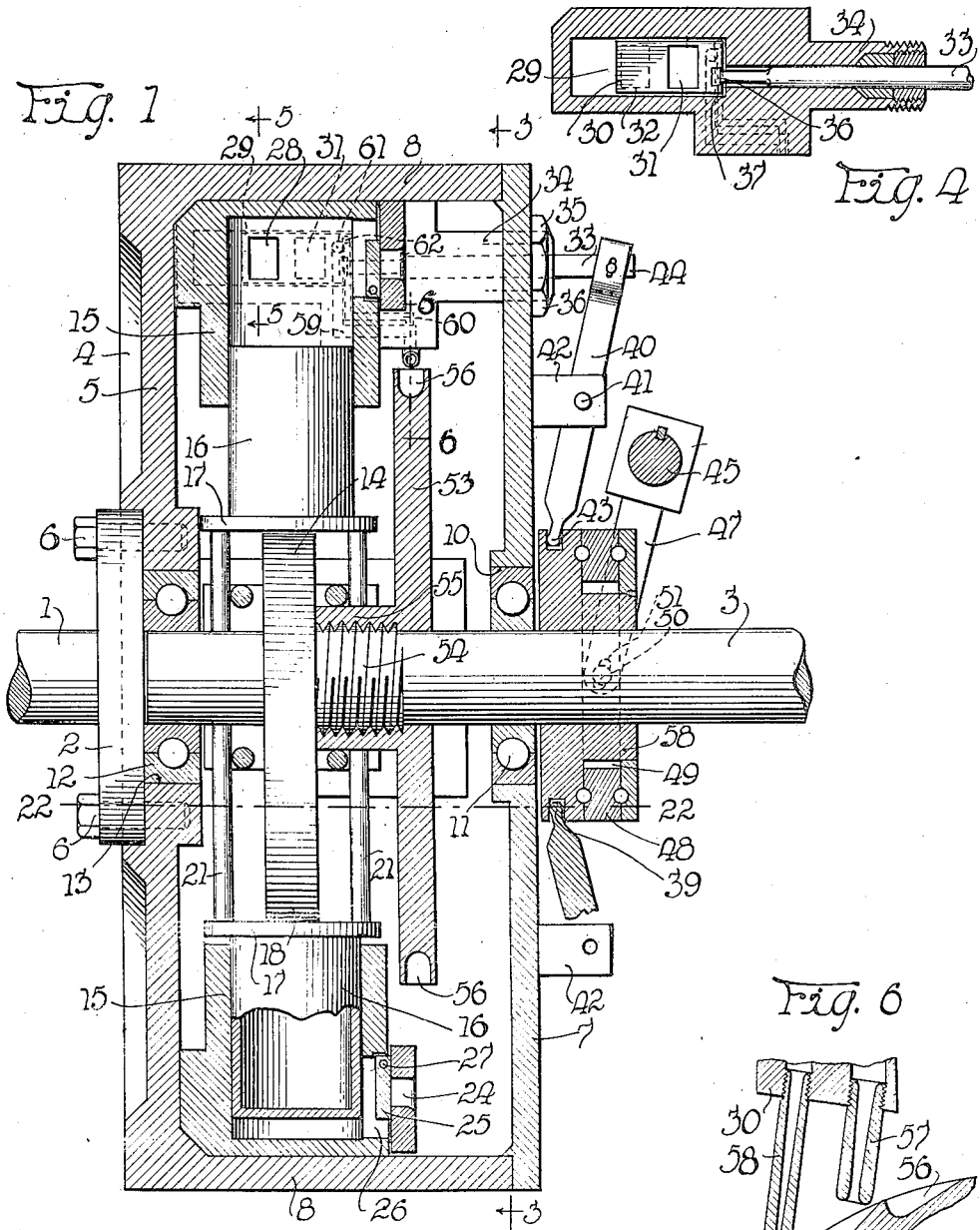
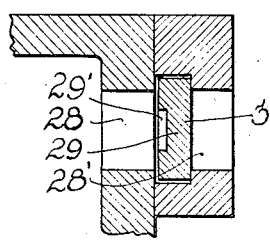
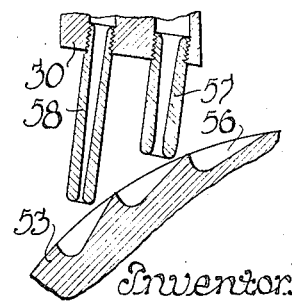
Inventors
Elmont F. Preston
Wilson W. Sides
By Brown, Boettcher & Dienner
Attorneys Nov. 13, 1923.  1,474,007
W. W. SIDES ET AL
HYDRAULIC CLUTCH
Filed April 26, 1919   2 Sheets-Sheet 2

Inventors
Elmont F. Preston
Wilson W. Sides
By Brown, Boettcher & Wiener
Attorneys Patented Nov. 13, 1923.

1,474,007

UNITED STATES PATENT OFFICE.

WILSON W. SIDES, OF LOWELL, AND ELMONT F. PRESTON, OF KEARNEY, NEBRASKA, ASSIGNORS TO JOHN W. PATTERSON, TRUSTEE, OF KEARNEY, NEBRASKA.

HYDRAULIC CLUTCH.

Application filed April 26, 1919. Serial No. 292,958.

*To all whom it may concern:*

Be it known that we, WILSON W. SIDES and ELMONT F. PRESTON, citizens of the United States, residing at Lowell, in the county of Kearney and State of Nebraska, and Kearney, in the county of Buffalo and State of Nebraska, respectively, have invented a certain new and useful Improvement in Hydraulic Clutches, of which the following is a full, clear, concise, and exact description, reference being had to the accompanying drawings, forming a part of this specification.

Our invention relates to improvements in clutches and has special reference to hydraulic clutches for connecting driving and driven shafts.

It is common practice to introduce a clutch of some kind between the engine and the transmission on an automobile by means of which the power can, at will, be connected to or disconnected from the transmission mechanism. This clutch is usually some form of friction clutch so that the power can be applied gradually, but in the usual operation of applying power by means of such friction clutches the operation of putting the machine into motion is not always accomplished smoothly and without jerks, as the friction devices usually take hold or engage in such a manner as to preclude the smooth, gradual starting of the machine.

A special object is to provide means for connecting the engine shaft to the transmission shaft which shall so operate as to preclude the possibility of any but the smooth gradual application of the power to the transmission. By means of the invention the power can begin to be applied thru what may be termed a gear ratio of one to infinity, and then gradually reduced to a ratio of one to one, or in other words to a condition of direct drive or direct connected condition.

The improved clutch or clutching system consists of a closed casing carried by the engine shaft and which takes the place of and acts as the fly wheel of the engine. This casing is adapted to contain a suitable liquid such as oil, which upon starting the engine is caused by centrifugal action to occupy a position in contact with the inner periphery of the casing in the form of a ring of oil. Within this ring of oil is arranged a number of pairs of opposed cylinders, preferably two pairs, each open at its inner end and closed at its outer end. Pistons are provided in the cylinders projecting from their inner ends and the opposed pistons are connected together for simultaneous movement. The driven shaft projects centrally within the casing and is provided with an eccentric thereon within the casing and in the plane of the cylinders. Preferably the two pairs of cylinders are arranged at right angles to each other so as to avoid any dead center in the clutch. Cross head plates are secured on the inner ends of the pistons and contacting with the outer ring of a ball bearing which is arranged around the periphery of the eccentric so that there is produced in effect movable abutments engaging the eccentric and operable thereupon as upon a crank to cause the driven shaft to rotate with the engine shaft. If the pistons are permitted to reciprocate freely in the cylinders the casing can rotate freely around the driven shaft without causing same to rotate, but if resistance to reciprocation of the pistons is produced then the cross heads act upon the eccentric to cause the driven shaft to rotate. To produce this resistance to the free reciprocation of the pistons there is provided an outlet port for each cylinder and these ports are controlled by valves which are arranged to be adjusted manually so that the ports can be gradually closed thus gradually shutting off the escape of the oil from the cylinder and consequently gradually applying resistance to the movement of the pistons and in turn gradually applying the torque to the driven shaft. While a device as thus outlined might operate under some conditions with sufficient smoothness to be practicable there are additional means provided for applying a starting torque to the driven shaft which shall operate with an extremely gradual application of power and which will assist in causing the closing of the cylinders to be more finely graduated than would otherwise be the case. This means comprises a power disk mounted on the driven shaft 3 within the casing and adjacent to the eccentric, and provided with pockets in the periphery and nozzles projecting from the cylinders and adapted to eject streams of the liquid against the periphery of the disk and into the pockets of the disk in a direction to cause the disk to rotate in the same direction as the casing. Preferably two of these nozzles are provided for each cylinder, one larger than the other, and the valves and ports are so arranged that the larger nozzle is cut off first and finally the smaller nozzle is cut off.

The main outlets for the cylinders, which are independent of the nozzles, are large enough so that when they are wide open there is substantially no resistance to the reciprocation of the pistons, and the manual control valves are arranged to first close these main outlet ports and then in succession to close the ports leading to the larger and then to the smaller nozzles. The main outlet port and the two nozzles all permit liquid to escape from the cylinder upon an outward movement of the piston therein and the effect of gradually closing the main outlet port is to gradually increase the pressure in the cylinder upon the outward movement of the piston and thus gradually increase the escape of the oil thru the nozzles. The outlet ends of the nozzles are arranged close to the periphery of the power disk and this close relation acts to hinder the escape of the oil thru the nozzles, more and more as the pressure increases, until when the main outlet is completely closed and the pressure within the cylinder reaches a high point the streams of fluid escaping thru the nozzles against the power wheel produce a maximum force on the disk and also produce a maximum back pressure which assists in building up the pressure within the cylinder. At such time it of course becomes increasingly difficult to force the pistons outwardly, and this acts as a rotative pressure or force upon the eccentric to cause the eccentric and the driven shaft to rotate with the casing. At such times the rotative effect of the streams of oil striking the power disk are added to the torque produced by the retarded movement of the pistons. The ports leading to the nozzles are then gradually closed, the larger one in advance of the smaller one, thus increasing more and more the resistance to movement of the pistons, until finally the nozzle ports are entirely closed, thus preventing all escape of oil from the cylinder. As the oil cannot escape, the pistons cannot move outwardly in the cylinders and the result is that the eccentric is rotatably locked to the casing and is caused to rotate with the casing and at the same speed and the object of the device in clutching the driving and driven shafts together is accomplished.

It will now be apparent that the speed of the driven shaft is under immediate and absolute control, that by gradually opening the escape ports in the order reverse to their closing the speed of the driven shaft can be gradually reduced, provided, of course, that at such time it is transmitting power, or in the case of an automoblie power plant, that it is driving the automobile. It will be apparent also that by opening the ports more or less, the amount of oil which escapes from the cylinders can be controlled, which in turn controls the amount of slippage between the driving and driven shafts, or in other words, the speed of the driven shaft. In this manner the speed of the automobile in crowded traffic can be easily controlled, the machine can be started and stopped as often as may be necessary and it can be run very slowly or made to just crawl along, or speed can be quickly increased to a higher speed, as may be determined by the condition of traffic. In other words, the invention provides means by which the application of power to the automobile can be readily controlled from no speed to high speed, the engine running at substantially a single speed, in fact our clutch combines the functions of the ordinary clutch and the speed changing gears and under many conditions eliminates the necessity for other power changing means.

For a clear understanding of the invention, reference is made to said drawings, in which:

Figure 1 is a central longitudinal section of a hydraulic clutch made in accordance with the invention;

Figure 4 is a sectional view substantially on the line 4—4 of Figure 3, particularly illustrating the controlling valve;

Figure 5 is a fragmentary section on the line 5—5 of Figure 1; and

Figure 6 is a fragmentary vertical sectional view substantially on the line 6—6 of Figure 1 particularly illustrating the nozzles and power wheel.

Figure 2:
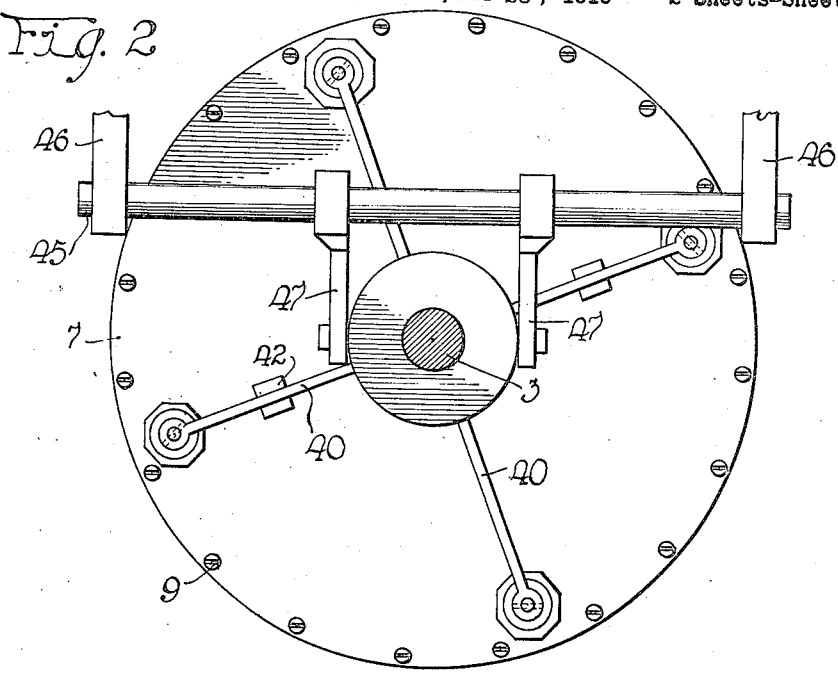
Figure 2 is a fragmentary elevation of the clutch illustrating the means of controlling the valves.

In said drawings 1 represents the power or driving shaft which may be an automobile shaft or other prime mover. The shaft is provided with a flange 2 on its extreme rear end by means of which the clutch is connected to the engine shaft. In substantial alignment with the shaft 1 is arranged the driving shaft 3 which, in the form illustrated, is the shaft which transmits power to the transmission mechanism of the automobile, but may obviously represent any shaft to which power is to be applied.

The operating mechanism of the clutch is enclosed in a cylindrical casing 4 closed on one side by a wall 5 to which the flange 2 is secured by bolts 6 and closed at the opposite side by a disk cover 7 secured at its edge to the cylindrical wall 8 of the casing by screws 9.

The wall 5 of the casing is provided with a shallow central sunken seat for the flange 2 by which the casing is held concentric with the shaft 1. This casing and the devices and oil which it carries constitute the fly wheel of the engine. The driven shaft 3 projects thru a central opening 10 in the cover member 7 and we interpose a ball bearing 11 between the shaft and the cover 7 which closes the opening 10 and holds the shaft 3 and the casing concentric. The shaft 3 projects centrally thru the casing and we mount its forward end in a ball bearing 12 arranged in a central opening 13 in the wall 5 of the casing. The casing 4 is thus mounted to rotate freely around the shaft 3. The ball bearings 11 and 12 serve both as radial and thrust bearings and the shaft 3 is held thereby against longitudinal movement relatively to the casing.

For the purpose of providing means by which the shaft 3 can be engaged to force it to rotate with the casing 4, an eccentric 14 is mounted on the shaft 3 within the casing 4. The eccentric is mounted to rotate with the shaft 3 and may be secured to the shaft in any suitable manner as by being made integral therewith.

Within the casing is arranged a number of pairs of opposed cylinders 15, preferably two pairs of the opposed cylinders arranged at 90 degrees to each other in order to avoid any dead center relative to the eccentric 14. These cylinders are arranged at the periphery of the casing, they extend radially and are centrally disposed relatively to the eccentric 14. The cylinders are secured in position in the casing, the two cylinders of each pair being diametrically opposed to each other on opposite sides of the shaft 3 and eccentric 14. The cylinders are open at their inner ends and closed at their outer ends, and a hollow piston 16 is arranged in each cylinder and adapted to reciprocate therein radially of the casing. These pistons are trunk pistons and are guided in the cylinders. At the inner end of each piston is provided a cross head plate 17 which is rigidly secured to the iner end of the piston and which is adapted to contact with the outer ring 18 of a ball bearing which surrounds and forms a co-operating part of the eccentric 14. An inner ball ring 19 is secured on the periphery of the eccentric and a ring of balls 20 is interposed between the two rings 18 and 19 to reduce the friction between the eccentric and the cross head plates 17 to a minimum. The opposed cross head plates 17 are connected together by four connecting rods 21 which span or straddle the shaft 3 and the eccentric 14 and hold the opposed plates in contact with the outer periphery of the ring 18.

Figure 3:
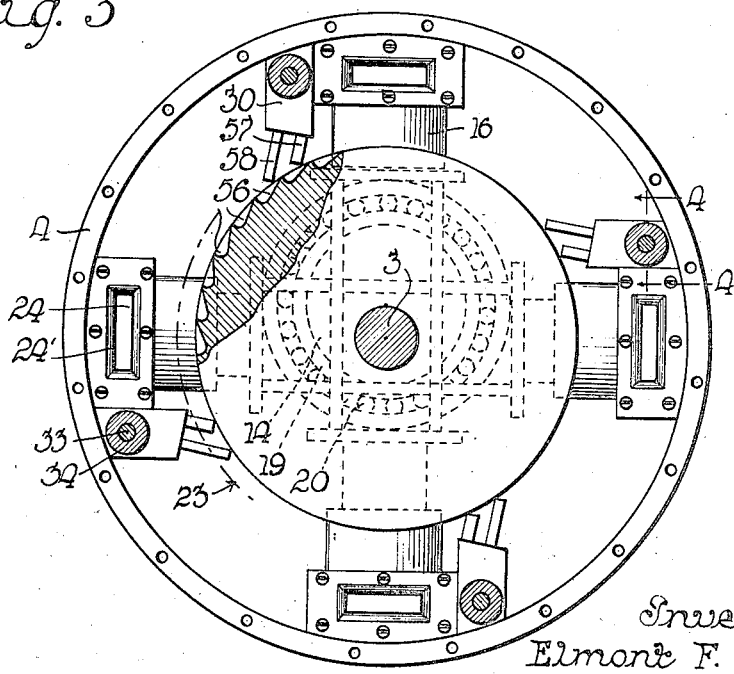
Figure 3 is a fragmentary sectional view substantially on the line 3—3 of Figure 1, showing the casing in elevation with the rear cover removed.

It will now be evident that when the casing 4 rotates, the cylinders and the pistons are carried around the shaft 3 and the pistons 16 are reciprocated in the cylinders by the radial action of the eccentric 14 on the cross head plates 17. It will also be evident that if resistance is introduced to the free reciprocation of the pistons 16 in the cylinders, this resistance will react upon the eccentric 14 and cause it to rotate with the casing 4. A quantity of suitable liquid is provided in the casing 4 which, when the casing is at rest, stands at about the line 22 of Figure 1 and when the casing is rotating at a practical speed this liquid is thrown out by centrifugal force and forms a ring to contact with the inner periphery of the casing, the inner surface of the ring being substantially on the circle 23, Figure 3. It will now be evident that when the casing is running the several cylinders 16 are substantially submerged in a liquid which may be a suitable oil and that this liquid is under pressure commensurate with the speed and the radial depth of the liquid.

To permit the oil to enter the cylinders upon the inward movement of the pistons therein we provide each cylinder with an inlet port 24 adjacent to its outer end and controlled by a flat valve 25 arranged within a chamber 26 and pivotally mounted on a pivot pin 27. This valve is adapted to close outwardly and to permit the oil to enter the cylinder with which the chamber 26 connects. The pivot 27 of the valve 25 is arranged at the inner edge of the valve, and the seat against which the valve closes is radial so that centrifugal action upon the valve tends to hold it seated and the inlet port 24 closed. This method of closing the valve avoids the necessity of any spring and tends to make the operation of the valve noiseless. It should be understood that the oil flows freely into the cylinder upon the inward movement of the piston therein from the body of oil within the casing, and as this body of oil is under considerable pressure this pressure independently of the suction effect of the piston causes the cylinder to be completely filled with the oil upon each inward movement of the piston. To reduce friction and increase efficiency in the operation of the device the several openings thru which the oil flows are provided with round corners as at 24' for the port 24. To permit the oil to escape from the cylinder and thus not retard the free movement of the piston in the cylinder, a relatively large outlet opening 28 is provided at the outer end of the cylinder, which port opens into a valve chest 29 provided with a similar port 28' in its outer wall and which chest contains a slide valve 30 for controlling the port 28'.

Said valve is provided with a port 31 which is adapted to register with the port 28' when it is desired to permit the casing 4 to rotate freely around the shaft 3 and to be moved to a position out of register with said port 28' at which time the port is closed by the projecting end 32 of the valve, when it is desired to cause the shaft 3 to rotate with the casing. Each valve 29 is provided with a longitudinal groove 29' in its inner face thru which the oil can flow from the cylinder into the valve chamber and thus hold the valve to its seat. Means are provided for controlling the valves 29 manually from a point outside the casing 4. For this purpose each valve 29 has a valve stem 33 which extends thru the cover 7. A boss 34 on the valve chest 30 is provided thru which the valve stem 33 projects. This boss projects thru a suitable hole in the cover 7 and is secured tightly to the cover by a nut 35 threaded on to the outer projecting end of the boss 34. To prevent leakage of the oil around the valve stem a gland nut 36 is threaded into the outer end of the boss 34 and adapted to compress suitable packing around the valve stem 33. The inner end of the valve stem has a button head 36 adapted to fit in a T slot 37 in the end of the valve for connecting the valve to the rod. For reciprocating the rod 33 and thus adjusting the valve a collar 38 is slidably mounted on the shaft 3 and having a circumferential groove 39 in its periphery. For transmitting motion from the collar 38 to the valve stem a lever 40 is provided for each valve, pivoted between its ends on a pivot pin 41 carried by a projection 42 on the cover 7. The inner end of the lever 40 is provided with a ball end 43 which enters the groove 39 and its outer end is provided with an eye surrounding the outer end of the valve stem and is pivotally connected to the outer end of the valve stem by a pivot pin 44. The hole in the lever which receives the pin 44 is elongated to permit the lever to swing freely and reciprocate the valve stem.

For controlling the position of the collar 38 on the shaft 3 and thus controlling the position of the valve 39, a cross shaft 45 is mounted in suitable hangers 46 and adapted to be oscillated by a suitable control lever (not shown). Upon the shaft 45 is mounted a pair of crank arms 47 which are keyed or otherwise rigidly secured to the shaft to rotate therewith. These cams span the collar 38 and are pivotally connected to a ring 48 mounted in a groove 49 in the collar by diametrically opposed pivot pins 50. The arms 47 are provided with elongated openings 51 to receive the pins 50 to allow for the angular motion of the arms. The ring 48 is mounted between rings of anti-friction balls 52 to reduce the friction at this point.

As thus far described, it is obvious that the valves 29 can be controlled manually to regulate the flow of oil out of the cylinder through the ports 28' and thus regulate the rotative effect of the pistons 16 upon the eccentric 14, or by closing the ports 28' entirely, lock the casing to the eccentric and cause the casing and the shaft 3 to rotate together. It is obvious also that when the pistons can reciprocate freely in the cylinders no torque will be applied to rotate the shaft 3.

In order to provide a more finely graduated application of the torque to the shaft 3 and ensure its smooth, positive and easy starting into motion and increase in speed, means are provided for causing a more finely graduated building up of pressure in the cylinders and for applying a positive rotative pressure to the shaft in addition to the rotative effect of the resistance to the reciprocating pistons.

This means consists of a disk 53 secured to the shaft 3 within the casing 4 and adjacent to the eccentric 14. To tightly secure the disk 53 upon the shaft 1, the shaft has a threaded portion 54 and the hub 55 of the disk has an internal threaded opening fitting upon the threaded portion 54, the inner end of the hub 55 being adapted to jam against the adjacent face of the eccentric 14. The thread 54 is formed so that the force applied to the disk to revolve it will tend to keep it screwed tightly against the eccentric 14. The disk is large enough so that its outer edge is adjacent to the several valve boxes 30 and the periphery is provided with pockets 56 having curved bottoms; the disk is a power wheel disk, and means are provided for directing streams of liquid into said pockets in a direction to cause the disk to rotate in the same direction as the casing 4 is rotated. For this purpose nozzles 57 and 58 project from the valve boxes 30 and at a suitable angle to the disk and adapted to direct liquid thru same into the pockets 56. These nozzles are connected by passages 59 and 60 respectively extending thru the walls of the valve box with ports 61 and 62 respectively opening thru the outer wall of the valve chest into the valve chamber in which the valve 29 is mounted and adjacent to the forward end thereof. The groove 29' in the back of the valve permits the oil to flow freely to its forward end to enter the ports 60 and 61. The opening thru the nozzle 57, its connecting passage and its port 61 are larger than the opening thru the nozzle 58 and its connecting passage and port. These ports are adapted to be closed in succession by the outward movement of the valve 29 and after the port 28' of the cylinder has been closed. The larger port 61 is arranged to be closed before the smaller port 62 so that the final closing of all outlet ports of the cylinder is accomplished when the smaller port 62 is closed. As the valve 29 is drawn out and the port 28' begins to be closed the pressure in the cylinder begins to rise and thus oppose the outward movement of the piston in the cylinder and the oil is forced out thru the nozzles 57 and 58 and against the periphery of the disk 53 into the pockets thereof. As the pressure continues to rise in the cylinder due to the further closing of the port 28' the streams of oil issuing thru the nozzles 57 and 58 begin to have a rotative effect upon the disk 53. As the port 28' continues to be more nearly closed and the pressure rises, it substantially reaches a maximum when the port 28' is finally closed and the projecting streams then have a maximum effect on the disk to cause the same to rotate. A further important function of the nozzles and the power wheel is that of producing a back pressure in the nozzles and thus restricting the escape of fluid from the cylinder and consequently increasing the resistance of the movement of the piston in the cylinder. To assist this action the openings in the nozzles, as best shown in Figure 6, are contracted adjacent to their outer ends at 57' and flared outwardly at their extreme ends both to cause the issuing oil to attain a high speed as it is projected from the nozzles and to increase this back pressure effect, the outer ends of the nozzle ending very close to the periphery of the power wheel 53. As the valve 29 continues to be drawn out after it closes the port 28' it closes off the larger port 61 leading to the nozzle 57 and then in succession the smaller port 62, at which time, of course, the oil cannot be projected thru the nozzles 57 and 58, but at this time, as the pistons are effectively blocked in the cylinders and cannot reciprocate therein, the eccentric 14 and the shaft 3 are caused to rotate with the casing 4.

As the outlet port 28' begins to be closed, the operative connection between the casing 4 and the shaft 3 can be likened to a gear ratio of one to infinity, as the casing 4 can rotate at a very high speed and the shaft 3 at a very low speed and as the valve is drawn out to close off the escape of oil from the cylinder, this ratio is continuously reduced until at the final locked condition of the pistons the ratio is one to one, or the shaft 3 is locked to the shaft 1 and they revolve together.

It will be obvious that any degree of slippage can be provided between these shafts by the manipulation of the control valves so that the speed of the automobile can be readily controlled. Furthermore as the power produced thru the projection of the streams of oil upon the power wheel is turned immediately into work to turn the wheel 53 and the shaft 3, we are enabled to maintain the clutch at a relatively low temperature, or in other words to prevent overheating of the clutch when it is being used in congested traffic.

In effect our device is a mechanical power and speed transformer, as it is capable of receiving the power at high rotative speed and low torque and delivering at relatively low rotative speed and high torque and is capable of adjustment to provide any desired ratio between the driving and driven shafts and at a very high degree of efficiency and economy.

As it is obvious that many modifications of the invention will readily suggest themselves to one skilled in the art, we do not limit or confine our invention to the specific structures herein shown and described.

We claim:

1. A rotatable closed casing, a driven shaft concentrically entering the casing, an eccentric on the driven shaft within the casing, opposed cylinders within the casing at the periphery thereof and in the plane of the eccentric, pistons reciprocable in said cylinders, means connecting opposed pistons together, cross head plates on the pistons engaging the eccentric, the casing adapted to contain oil, an inlet port for each cylinder adjacent to the periphery of the casing, a check valve controlling each inlet port, an outlet port for each cylinder, a valve for controlling each outlet port, means for simultaneously manually adjusting said outlet valves, a power disk on the driven shaft within the casing, and means directing jets of liquid from the cylinders into the pockets of the disk in a direction to cause the disk to rotate in the same direction as the casing.

2. A rotatable closed casing, a driven shaft concentrically entering the casing, an eccentric on the driven shaft within the casing, opposed cylinders within the casing at the periphery thereof and in the plane of the eccentric, pistons reciprocable in said cylinders, means connecting opposed pistons together, cross head plates on the pistons engaging the eccentric, the casing adapted to contain oil, an inlet port for each cylinder adjacent to the periphery of the casing, a check valve controlling each inlet port, an outlet port for each cylinder, a valve for controlling each outlet port, means for simultaneously manually adjusting said outlet valves, a back pressure disk on the driven shaft having pockets in its periphery, and nozzles projecting from the cylinders towards the disk and ending adjacent to the periphery thereof and adapted to project streams of the liquid into the pockets of the disk to cause the disk to revolve in the same direction as the casing.

3. In combination, a driving shaft, a driven shaft in substantial alignment therewith, a casing rotatable with the driving shaft, two cylinders arranged within the casing at substantially 90 degrees to each other and adjacent to the periphery thereof, an eccentric on the driven shaft within the casing in alignment with said cylinders, pistons reciprocal in said cylinders, means operatively connecting said pistons to said eccentric to cause the pistons to reciprocate in the cylinders when the two shafts do not rotate together, a disk on the driven shaft adjacent to said eccentric, said disk having pockets in its periphery, nozzles projecting from the cylinders toward the disk and ending adjacent to the periphery thereof and adapted to project streams of liquid into said pockets to cause the disk to revolve in the same direction as the casing, means for gradually cutting off communication between said nozzles and the cylinders to close the cylinder against the escape of fluid.

4. In combination, a driving shaft, a driven shaft, a hollow casing carried by the driving shaft adapted to contain a liquid, an eccentric on the driven shaft within the casing, opposed cylinders within the casing in the plane of the eccentric and rotatable with the casing, pistons operable in the cylinders, means operable by the cam whereby relative rotation of the two shafts causes said pistons to reciprocate to pump liquid into and out of the cylinders, valves controlling the flow of liquid out of said cylinders, a disk on the driven shaft having pockets in its periphery, nozzles projecting from the cylinders and adapted to direct streams of liquid into said pockets to rotate the disk and the driven shaft in the same direction as the driving shaft is rotating, means for operating said valves manually, said valves being adapted to close off connection between the cylinders and said nozzles.

5. In combination, a driving shaft, a driven shaft, a hollow casing carried by the driven shaft adapted to contain a working liquid, an eccentric on the driven shaft within the casing, opposed cylinders in the casing in the plane of said eccentric, pistons in the cylinders, means operable by said cam for engaging the pistons to reciprocate them in the cylinders to pump liquid into and out of the cylinders, valves controlling the flow of liquid out of said cylinders, a power wheel on the driven shaft adjacent to said eccentric, nozzles of different sizes projecting from each cylinder and ending adjacent to the periphery of the power disk, and adapted to eject streams of fluid from the cylinders against said disk to rotate the disk in the same direction as the casing is rotated, means for operating said valves manually to control the flow of fluid from the cylinders, said valves being adapted to cut off the supply to the larger nozzle in advance of cutting off the supply to the smaller nozzle.

6. In combination, a driving shaft, a driven shaft, a hollow casing carried by the driving shaft adapted to contain a liquid, an eccentric on the driven shaft within said casing, opposed cylinders in the casing in the plane of said eccentric, pistons movable in the cylinders, means connecting opposed pistons and adapted to be engaged by the eccentric to move said pistons out and in, each said cylinder having a main outlet port and two auxiliary outlet ports, a valve for controlling said ports, the valve being adapted to close the main outlet port in advance of the auxiliary ports, a disk on the driven shaft adjacent to said eccentric, said disk having pockets in its periphery, nozzles carried by said cylinders and connected to said auxiliary ports and adapted to project streams of liquid against the periphery of said disk to rotate the disk and the driven shaft in the same direction as the casing is rotating, said valves being adapted to close said auxiliary ports one after the other.

7. The hereindescribed mechanical power transformer comprising a rotatable casing adapted to contain a working liquid, which in operation is held in the form of a ring against the inner periphery of the casing, a shaft concentric with the casing and rotatable relative thereto, pumps carried by the casing adapted to be immersed in said liquid, a cam on the shaft within the casing, means operatively connecting the pumps to the cam to cause the pumps to operate upon relative rotation of the casing and the shaft, means for controlling the operation of said pumps, a power wheel on the shaft having peripheral pockets, and means for directing streams of liquid from said pumps against the periphery of said power wheel to cause the wheel and the shaft to rotate in the same direction as the casing.

8. A power transmitting mechanism comprising a driving shaft and a driven shaft, an hydraulic pump connected with and actuated by relative rotation between said shafts, a turbine wheel connected with said driven shaft, means for admitting liquid to said pump, means for permitting the liquid to escape from said pump to permit said driving shaft to idle, and means for directing liquid from said pump to said wheel to slowly rotate said driven shaft, and for completely cutting off the escape of liquid from said pump to lock said shafts together.

9. A device for transmitting power from a driving shaft to a driven shaft comprising an hydraulic pump for connection with and actuated by relative rotation between the shafts, a turbine wheel for connection with the driven shaft, means for admitting liquid to said pump, means for permitting a free escape of liquid from said pump to permit free relative rotation between the shafts, and means for directing the flow of liquid from said pump against said wheel and for completely cutting off the escape of liquid from said pump to cause a slight rotation of the driven shaft or to lock the shafts together to effect an equal rotation of both shafts.

10. A device for transmitting power from a driving shaft to a driven shaft comprising an hydraulic pump for connection with and actuated by relative rotation between the shafts, a turbine wheel for connection with the driven shaft, a plurality of nozzles for directing streams of liquid against said wheel, means for admitting liquid to said pump, means for permitting a free escape of liquid from said pump to permit free rotation of said driving shaft with respect to said driven shaft, means for diverting more or less of the liquid from said pump to said nozzles to cause a slow rotation of said driven shaft, and means for completely cutting off the flow of liquid from said pump to prevent the operation of said pump so that the shafts will rotate together.

11. In an hydraulic transmission the combination with a driving shaft and a driven shaft, of a turbine element connected with said driven shaft, means for setting up an hydraulic flow in acordance with the relative rotation between said shafts, said means including an opening for permitting a free flow of the liquid to permit said driving shaft to idle, means for transmitting more or less of the energy of said flow to said turbine element to slowly rotate said driven shaft, and means for effecting a positive connection between said shafts to cause a direct driving relation.

12. In an hydraulic transmission the combination with a driving shaft and a driven shaft, of a turbine element connected with said driven shaft, a reciprocating pump for setting up an hydraulic flow in accordance with the relative rotation between said shafts, said pump having an opening permitting a free flow of the liquid to permit said driving shaft to idle, means for directing at least some of the liquid against said turbine element to slowly rotate said driven shaft, and means for effecting a positive connection between said shafts to cause a direct driving relation.

13. The method of controlling the transmission of power from one shaft to another which consists in setting up an hydraulic flow by the relative rotation of the shafts, permitting such flow to continue without restriction to permit the driving shaft to idle, utilizing the impact of the flow to effect a slow rotation of the other shaft, and cutting off the flow to prevent relative rotation between the shafts.

14. The method of controlling the transmission of power from one shaft to another which consists in setting up an hydraulic flow by the relative rotation of the shafts, permitting such flow to continue without restriction to permit the driving shaft to idle, utilizing the impact of the flow to effect a slow rotation of the other shaft, and locking the shafts together in a direct drive relation.

In witness whereof we hereunto subscribe our names this 23rd day of April, 1919.

WILSON W. SIDES.
ELMONT F. PRESTON.